(12) United States Patent
Kurian

(10) Patent No.: US 10,979,392 B2
(45) Date of Patent: Apr. 13, 2021

(54) PREVENTING UNAUTHORIZED ACCESS TO SECURE ENTERPRISE INFORMATION SYSTEMS USING A MULTI-FILTERING AND RANDOMIZING CONTROL SYSTEM

(71) Applicant: Bank of America Corporation, Charlotte, NC (US)

(72) Inventor: Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 516 days.

(21) Appl. No.: 15/787,816

(22) Filed: Oct. 19, 2017

(65) Prior Publication Data

US 2019/0124044 A1   Apr. 25, 2019

(51) Int. Cl.
*H04L 29/06* (2006.01)
*H04L 29/08* (2006.01)
*G06F 9/455* (2018.01)

(52) U.S. Cl.
CPC ...... *H04L 63/0245* (2013.01); *H04L 63/1475* (2013.01); *H04L 63/18* (2013.01); *G06F 9/45558* (2013.01); *G06F 2009/45595* (2013.01); *H04L 67/06* (2013.01)

(58) Field of Classification Search
None
See application file for complete search history.

(56) References Cited

U.S. PATENT DOCUMENTS

| | | |
|---|---|---|
| 7,185,107 B1 | 2/2007 | Cassar |
| 7,356,596 B2 | 4/2008 | Ramanujan et al. |
| 7,360,245 B1 | 4/2008 | Ramachandran et al. |
| 7,525,921 B1 | 4/2009 | Yi Dar Lo |
| 7,565,426 B2 | 7/2009 | Jones et al. |

(Continued)

OTHER PUBLICATIONS

Ali et al., Securing First-Hop Data Provenance for Bodyworn Devices Using Wireless Link Fingerprints, 2014, IEEE Transactions on Information Forensics and Security, vol. 9, No. 12, Dec. 2014, pp. 2193-2202 (Year: 2014).*

(Continued)

*Primary Examiner* — Luu T Pham
*Assistant Examiner* — Edward X Long
(74) *Attorney, Agent, or Firm* — Banner & Witcoff, Ltd.; Michael A. Springs

(57) ABSTRACT

Aspects of the disclosure relate to preventing unauthorized access to secure enterprise information systems using a multi-filtering and randomizing control system. A computing platform may receive, from a source user computing device, a request to pull source data from an enterprise system of record and may generate a transport pattern. Subsequently, the computing platform may generate and send one or more first configuration commands for the enterprise system of record based on the transport pattern. Then, the computing platform may generate and send one or more second configuration commands for a virtualization platform associated with the enterprise system of record based on the transport pattern. Thereafter, the computing platform may generate and send an initiation instruction command for the source user computing device based on the transport pattern, which may direct the source user computing device to send at least one request to at least one data filtering system.

12 Claims, 10 Drawing Sheets

(56) References Cited

U.S. PATENT DOCUMENTS

| | | | |
|---|---|---|---|
| 7,706,278 B2 | 4/2010 | Wing et al. |
| 7,852,772 B2 | 12/2010 | Filsfils et al. |
| 7,855,953 B2 | 12/2010 | Filsfils et al. |
| 7,864,669 B2 | 1/2011 | Bonaventure et al. |
| 7,889,655 B2 | 2/2011 | Retana et al. |
| 7,898,966 B1 | 3/2011 | Yi Dar Lo |
| 8,234,707 B2 | 7/2012 | Stone et al. |
| 8,281,400 B1 | 10/2012 | Eater et al. |
| 9,160,654 B2 | 10/2015 | Dispensa et al. |
| 9,497,113 B2 | 11/2016 | Dispensa et al. |
| 2013/0007849 A1* | 1/2013 | Coulter | G06F 21/313 726/4 |
| 2015/0295848 A1* | 10/2015 | Vlachogiannis | G06F 16/9535 709/226 |
| 2017/0086191 A1* | 3/2017 | Sipra | H04L 61/2007 |
| 2017/0270165 A1* | 9/2017 | Dong | H04L 65/60 |
| 2017/0289797 A1 | 10/2017 | Bae et al. |
| 2017/0289806 A1 | 10/2017 | Girdhar et al. |
| 2017/0290014 A1 | 10/2017 | Kim et al. |
| 2017/0290024 A1 | 10/2017 | Ouyang et al. |
| 2017/0290184 A1 | 10/2017 | Kim et al. |
| 2017/0290290 A1 | 10/2017 | Trottier et al. |
| 2017/0290877 A1 | 10/2017 | Combette et al. |
| 2017/0290970 A1 | 10/2017 | Friederichs et al. |
| 2017/0290976 A1 | 10/2017 | Murphy et al. |
| 2017/0291301 A1 | 10/2017 | Ibarz Gabardos et al. |
| 2017/0292077 A1 | 10/2017 | Young et al. |
| 2017/0292110 A1 | 10/2017 | Simpson et al. |
| 2017/0292159 A1 | 10/2017 | Shiffman et al. |
| 2017/0293181 A1 | 10/2017 | Jung et al. |
| 2017/0293272 A1 | 10/2017 | Jeong et al. |
| 2017/0293297 A1 | 10/2017 | Kim et al. |
| 2017/0293659 A1 | 10/2017 | Huang |
| 2017/0293663 A1 | 10/2017 | Oros et al. |
| 2017/0293675 A1 | 10/2017 | York et al. |
| 2017/0293693 A1 | 10/2017 | Oros et al. |
| 2017/0293727 A1 | 10/2017 | Klaassen et al. |
| 2017/0293749 A1 | 10/2017 | Baek et al. |
| 2017/0293755 A1 | 10/2017 | Kargman et al. |
| 2017/0293760 A1 | 10/2017 | Touboul |
| 2017/0293763 A1 | 10/2017 | Shear et al. |
| 2017/0293841 A1 | 10/2017 | McAllister et al. |
| 2017/0293845 A1 | 10/2017 | McAllister et al. |
| 2017/0293850 A1 | 10/2017 | Chawla et al. |
| 2017/0293851 A1 | 10/2017 | Chawla et al. |
| 2017/0293882 A1 | 10/2017 | Beier et al. |
| 2017/0294054 A1 | 10/2017 | Rosenbaum |
| 2017/0294176 A1 | 10/2017 | Ito |
| 2017/0294694 A1 | 10/2017 | Tso et al. |
| 2017/0294825 A1 | 10/2017 | Waikar et al. |
| 2017/0294883 A1 | 10/2017 | Kang et al. |
| 2017/0294953 A1 | 10/2017 | Ghosh et al. |
| 2017/0294965 A1 | 10/2017 | Ashrafi et al. |
| 2017/0295008 A1 | 10/2017 | Yilmazer et al. |
| 2017/0295014 A1 | 10/2017 | Baras et al. |
| 2017/0295057 A1 | 10/2017 | Dost et al. |
| 2017/0295072 A1 | 10/2017 | McFall |
| 2017/0295097 A1 | 10/2017 | Ganji et al. |
| 2017/0295208 A1 | 10/2017 | Richards et al. |
| 2017/0295242 A1 | 10/2017 | Jaman et al. |
| 2017/0295256 A1 | 10/2017 | Moriarty et al. |
| 2017/0295269 A1 | 10/2017 | Hosoi et al. |
| 2017/0295325 A1 | 10/2017 | Yoon et al. |
| 2017/0295414 A1 | 10/2017 | Murray |
| 2017/0295493 A1 | 10/2017 | Bailey, Jr. |
| 2017/0295538 A1 | 10/2017 | Zhang et al. |

OTHER PUBLICATIONS

Rothenberg et al., Self-routing Denial-of-Service Resistant Capabilities using In-packet Bloom Filters, 2009, 2009 European Conference on Computer Network Defense, pp. 46-51 (Year: 2009).*

* cited by examiner

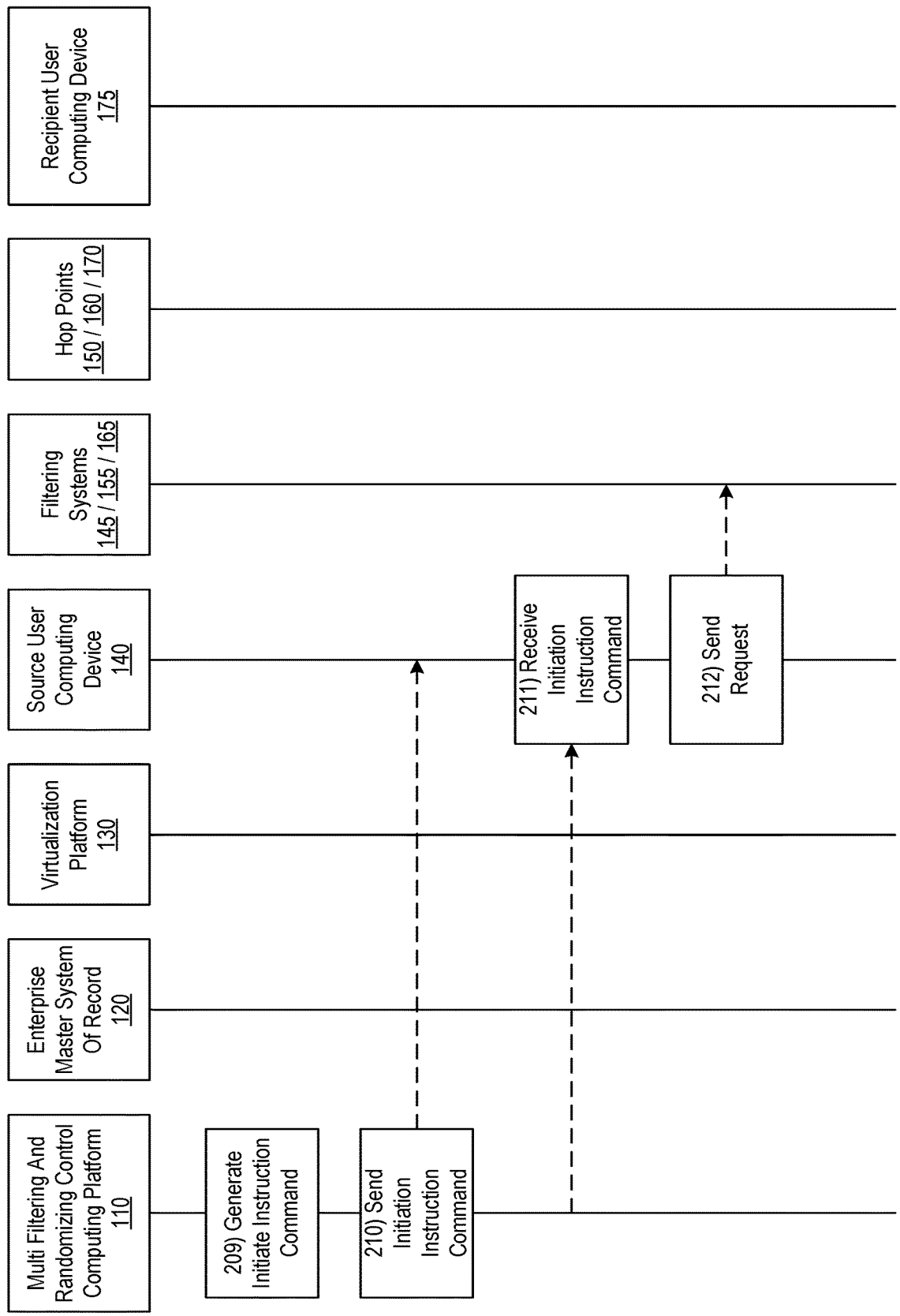

PREVENTING UNAUTHORIZED ACCESS TO SECURE ENTERPRISE INFORMATION SYSTEMS USING A MULTI-FILTERING AND RANDOMIZING CONTROL SYSTEM

BACKGROUND

Aspects of the disclosure relate to digital data processing systems, information security, and preventing unauthorized access to secure information systems. In particular, one or more aspects of the disclosure relate to preventing unauthorized access to secure enterprise information systems using a multi-filtering and randomizing control system.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems. In particular, one or more aspects of the disclosure relate to preventing unauthorized access to secure enterprise information systems using a multi-filtering and randomizing control system.

In accordance with one or more embodiments, a computing platform having at least one processor, a memory, and a communication interface may receive, via the communication interface, from a source user computing device, a request to pull source data from an enterprise system of record. Based on receiving the request to pull the source data from the enterprise system of record, the computing platform may generate a transport pattern. Subsequently, the computing platform may generate one or more first configuration commands for the enterprise system of record based on the transport pattern, and the one or more first configuration commands may identify the source data to be pulled. Then, the computing platform may send, via the communication interface, to the enterprise system of record, the one or more first configuration commands generated for the enterprise system of record. Subsequently, the computing platform may generate one or more second configuration commands for a virtualization platform associated with the enterprise system of record based on the transport pattern, and the one or more second configuration commands may identify one or more virtual system of record instances to be instantiated. Then, the computing platform may send, via the communication interface, to the virtualization platform associated with the enterprise system of record, the one or more second configuration commands generated for the virtualization platform associated with the enterprise system of record. Subsequently, the computing platform may generate an initiation instruction command for the source user computing device based on the transport pattern, and the initiation instruction command may direct the source user computing device to send at least one request to at least one data filtering system in accordance with the transport pattern. Then, the computing platform may send, via the communication interface, to the source user computing device, the initiation instruction command directing the source user computing device to send the at least one request to the at least one data filtering system in accordance with the transport pattern.

In some embodiments, generating the transport pattern may include generating the transport pattern based on one or more transport pattern templates stored in a library of transport pattern templates maintained by the computing platform. In some embodiments, generating the transport pattern may include: randomly selecting a transport pattern template from the library of transport pattern templates maintained by the computing platform; and using the transport pattern template selected from the library of transport pattern templates maintained by the computing platform as the transport pattern.

In some embodiments, prior to generating the initiation instruction command for the source user computing device based on the transport pattern, the computing platform may generate one or more third configuration commands for one or more filtering systems based on the transport pattern. Subsequently, the computing platform may generate one or more fourth configuration commands for one or more hop points based on the transport pattern. Then, the computing platform may send, via the communication interface, to the one or more filtering systems, the one or more third configuration commands generated for one or more filtering systems. In addition, the computing platform may send, via the communication interface, to the one or more hop points, the one or more fourth configuration commands generated for one or more hop points.

In some embodiments, generating the one or more third configuration commands for the one or more filtering systems based on the transport pattern may include generating at least one configuration command directing a first filtering system to access a first identified virtual system of record instance to request first partial source data based on the transport pattern. In addition, the first identified virtual system of record instance may be provided by the virtualization platform associated with the enterprise system of record.

In some embodiments, generating the one or more third configuration commands for the one or more filtering systems based on the transport pattern may include generating at least one configuration command directing the first filtering system to send, to a first hop point based on the transport pattern, source data received from the first identified virtual system of record instance.

In some embodiments, generating the one or more fourth configuration commands for the one or more hop points based on the transport pattern may include generating at least one configuration command directing the first hop point to forward source data received from the first filtering system to a second filtering system different from the first filtering system based on the transport pattern.

In some embodiments, generating the one or more third configuration commands for the one or more filtering systems based on the transport pattern may include generating at least one configuration command directing the second filtering system to access a second identified virtual system of record instance to request second partial source data based on the transport pattern. In addition, the second identified virtual system of record instance may be provided by the virtualization platform associated with the enterprise system of record.

In some embodiments, generating the one or more third configuration commands for the one or more filtering systems based on the transport pattern may include generating at least one configuration command directing the second filtering system to send, to a second hop point based on the transport pattern, source data received from the second identified virtual system of record instance and source data received the first hop point.

In some embodiments, generating the one or more fourth configuration commands for the one or more hop points based on the transport pattern may include generating at least one configuration command directing the second hop point to forward source data received from the second filtering system to a recipient user computing device based on the transport pattern.

In some embodiments, based on receiving an acknowledgement notification from the recipient user computing device, the computing platform may generate a confirmation notification for the source user computing device. Subsequently, the computing platform may send, via the communication interface, to the source user computing device, the confirmation notification generated for the source user computing device. In addition, sending the confirmation notification generated for the source user computing device to the source user computing device may cause the source user computing device to display the confirmation notification.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for preventing unauthorized access to secure enterprise information systems using a multi-filtering and randomizing control system in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
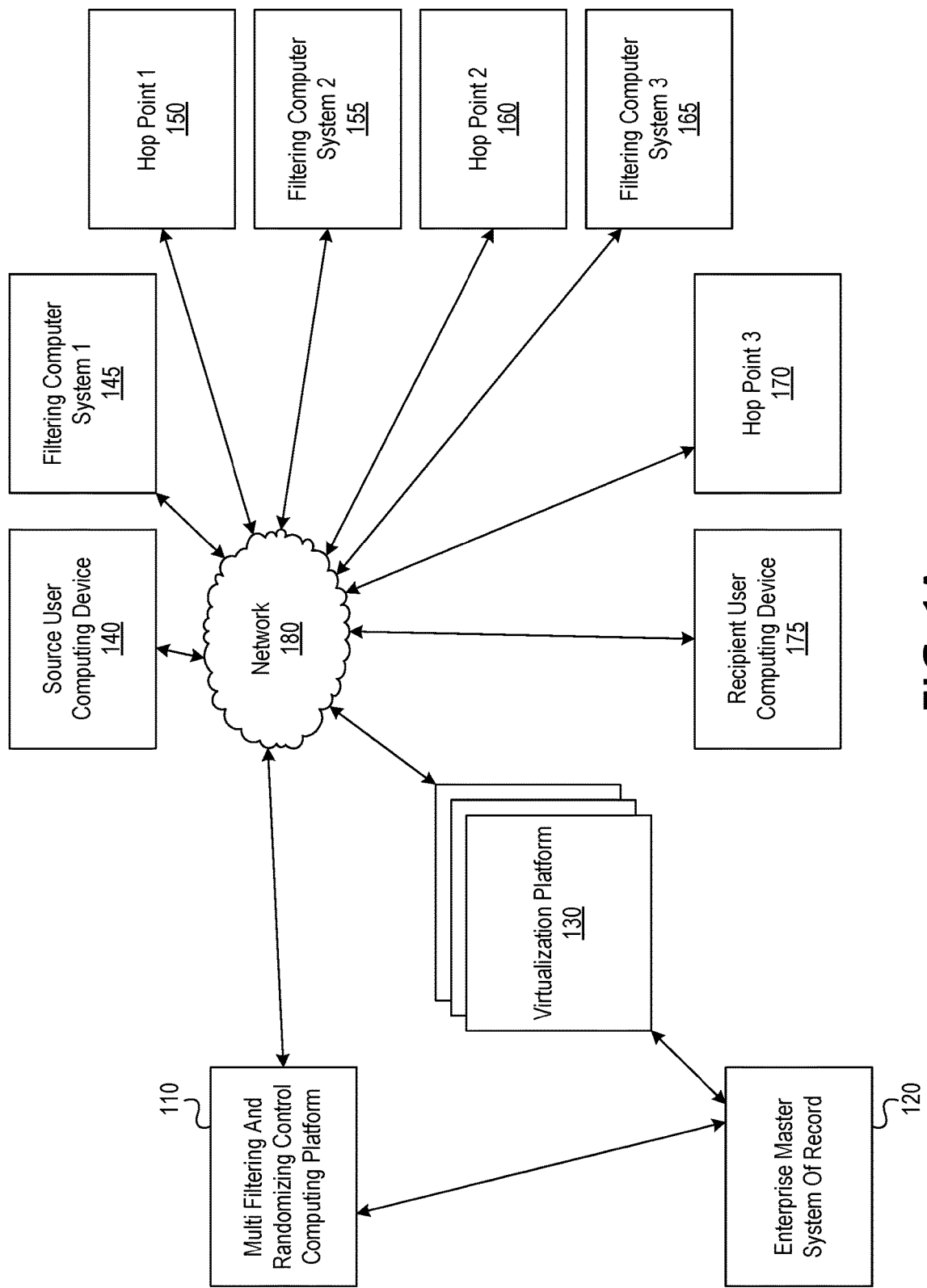
FIGS. 1A and 1B depict an illustrative computing environment for preventing unauthorized access to secure enterprise information systems using a multi-filtering and randomizing control system in accordance with one or more example embodiments.
Figure 1B:
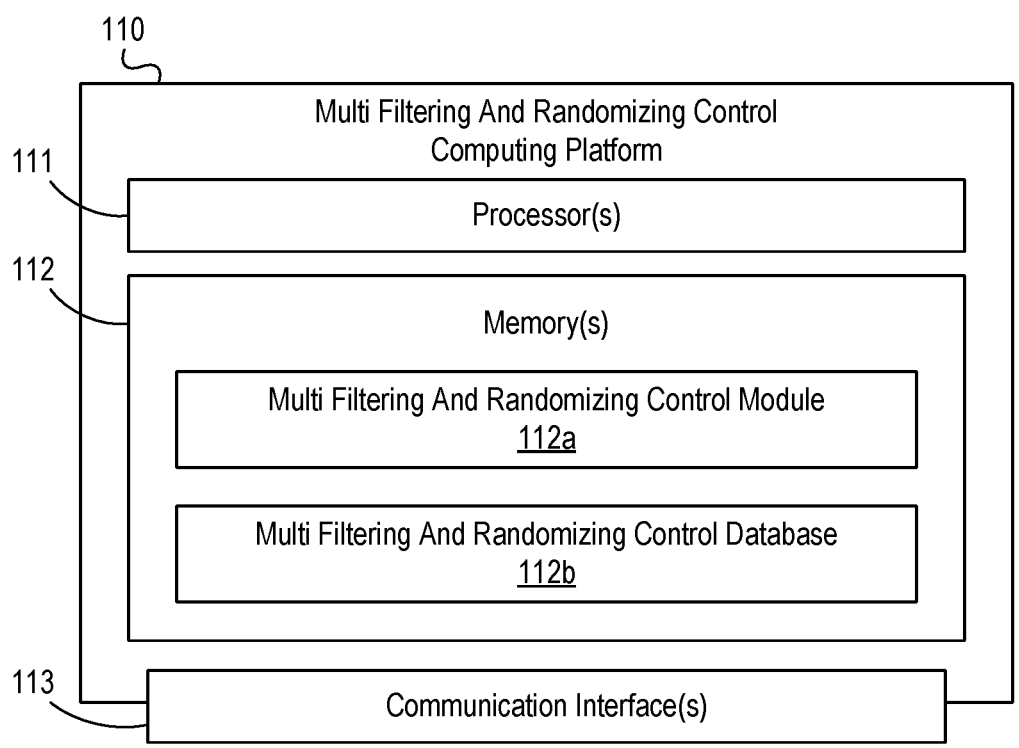

FIGS. 1A and 1B depict an illustrative computing environment for preventing unauthorized access to secure enterprise information systems using a multi-filtering and randomizing control system in accordance with one or more example embodiments. Referring to FIG. 1A, computing environment 100 may include various computer systems, which may be located in the same data center or in different data centers, and various other computing devices. For example, computing environment 100 may include a multi-filtering and randomizing control computing platform 110, an enterprise master system of record 120, a virtualization platform 130, a source user computing device 140, a plurality of filtering systems (e.g., filtering computer system 145, filtering computer system 155, filtering computer system 165), a plurality of hop points (e.g., hop point 150, hop point 160, hop point 170), and a recipient user computing device 175. Each of the data centers associated with computing environment 100 may be distinct and physically separate from other data centers that are operated by and/or otherwise associated with an organization, such as a financial institution. In addition, each data center associated with computing environment 100 may house a plurality of server computers and various other computers, network components, and devices.

Multi-filtering and randomizing control computing platform 110 may include one or more computer systems (e.g., servers, server blades, and/or the like) and may be configured to perform and/or otherwise provide one or more functions described herein, as discussed in greater detail below. Enterprise master system of record 120 may include one or more computer systems (e.g., servers, server blades, and/or the like) and may be configured to store, maintain, and/or update data associated with an enterprise organization. In some instances, enterprise master system of record 120 may be and/or include an enterprise data storage platform associated with a specific organization, and may store and/or maintain enterprise data in various tables and databases associated with different operational divisions within organization. Additionally or alternatively, enterprise master system of record 120 may store and/or maintain libraries and/or applications that may be accessed and/or used in connection with backend, development, and/or production systems. For instance, enterprise master system of record 120 may store and/or maintain user account data, financial account data, account balance information, transaction history information, user profile information, and/or other information used by and/or otherwise associated with an enterprise organization, such as a financial institution.

Virtualization platform 130 may include one or more computer systems (e.g., servers, server blades, and/or the like) and may be configured to generate, host, and/or otherwise provide one or more virtual machines. In some instances, virtualization platform 130 may, for instance, generate one or more virtual machine instances that include and/or provide access to some or all of the enterprise data stored and/or otherwise maintained by enterprise master system of record 120.

Source user computing device 140 may be a computing device (e.g., a laptop computing device, a desktop computing device, a mobile computing device, and/or the like) that may be used by a first user associated with an enterprise organization. In some instances, source user computing device 140 may be configured to provide one or more interfaces that allow the user of source user computing device 140 to initiate a data access and/or transfer process, as illustrated in greater detail below. Recipient user computing device 175 may be a computing device (e.g., a laptop computing device, a desktop computing device, a mobile computing device, and/or the like) that may be used by a second user associated with the enterprise organization. In some instances, recipient user computing device 175 may be configured to provide one or more interfaces that allow the user of recipient user computing device 175 to receive, view, and/or modify data obtained through a data access and/or transfer process initiated by source user computing device 140, as illustrated in greater detail below.

Filtering computer system 145 may be a computer system located at a data center associated with an enterprise organization. In some instances, filtering computer system 145 may be configured to receive requests associated with a data access and/or transfer process, retrieve enterprise data from one or more virtual machine instances, and/or transmit retrieved enterprise data to one or more hop points, one or more other filtering systems, and/or one or more other computer systems, as illustrated in greater detail below. Like filtering computer system 145, filtering computer system 155 may be a computer system located at a data center associated with the enterprise organization (which may, e.g., be the same data center as filtering computer system 145 or a different data center). In addition, filtering computer system 155 may be configured to receive requests associated with a data access and/or transfer process, retrieve enterprise data from one or more virtual machine instances, and/or transmit retrieved enterprise data to one or more hop points, one or more other filtering systems, and/or one or more other computer systems, as illustrated in greater detail below. Additionally, like filtering computer system 145 and filtering computer system 155, filtering computer system 165 may be a computer system located at a data center associated with the enterprise organization (which may, e.g., be the same data center as filtering computer system 145 and/or filtering computer system 155 or a different data center). In addition, filtering computer system 165 may be configured to receive requests associated with a data access and/or transfer process, retrieve enterprise data from one or more virtual machine instances, and/or transmit retrieved enterprise data to one or more hop points, one or more other filtering systems, and/or one or more other computer systems, as illustrated in greater detail below Hop point 150 may be a computer system located at a data center associated with an enterprise organization. In some instances, hop point 150 may be configured to receive, route, forward, and/or otherwise pass enterprise data from a source system (e.g., a particular filtering system or computing device) to a destination system (e.g., another particular filtering system or computing device), as illustrated in greater detail below. Like hop point 150, hop point 160 may be a computer system located at a data center associated with an enterprise organization (which may, e.g., be the same data center as hop point 150 or a different data center). In some instances, hop point 160 may be configured to receive, route, forward, and/or otherwise pass enterprise data from a source system (e.g., a particular filtering system or computing device) to a destination system (e.g., another particular filtering system or computing device), as illustrated in greater detail below. Like hop point 150 and hop point 160, hop point 170 may be a computer system located at a data center associated with an enterprise organization (which may, e.g., be the same data center as hop point 150 and/or hop point 160 or a different data center). In some instances, hop point 170 may be configured to receive, route, forward, and/or otherwise pass enterprise data from a source system (e.g., a particular filtering system or computing device) to a destination system (e.g., another particular filtering system or computing device), as illustrated in greater detail below.

In one or more arrangements, enterprise master system of record 120, virtualization platform 130, source user computing device 140, filtering computer system 145, hop point 150, filtering computer system 155, hop point 160, filtering computer system 165, hop point 170, and recipient user computing device 175 may be any type of computing device capable of receiving a user interface, receiving input via the user interface, and communicating the received input to one or more other computing devices. For example, enterprise master system of record 120, virtualization platform 130, source user computing device 140, filtering computer system 145, hop point 150, filtering computer system 155, hop point 160, filtering computer system 165, hop point 170, and recipient user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise master system of record 120, virtualization platform 130, source user computing device 140, filtering computer system 145, hop point 150, filtering computer system 155, hop point 160, filtering computer system 165, hop point 170, and recipient user computing device 175 may, in some instances, be special-purpose computing devices configured to perform specific functions.

Computing environment 100 also may include one or more computing platforms. For example, computing environment 100 may include multi-filtering and randomizing control computing platform 110. As illustrated in greater detail below, multi-filtering and randomizing control computing platform 110 may include one or more computing devices configured to perform one or more of the functions described herein. For example, multi-filtering and randomizing control computing platform 110 may include one or more computers (e.g., laptop computers, desktop computers, servers, server blades, or the like). Computing environment 100 also may include one or more networks, which may interconnect one or more of multi-filtering and randomizing control computing platform 110, enterprise master system of record 120, virtualization platform 130, source user computing device 140, filtering computer system 145, hop point 150, filtering computer system 155, hop point 160, filtering computer system 165, hop point 170, and recipient user computing device 175. For example, computing environment 100 may include network 180, which may include one or more public networks, one or more private networks, and/or one or more sub-networks (e.g., local area networks (LANs), wide area networks (WANs), or the like) and which may interconnect one or more of multi-filtering and randomizing control computing platform 110, enterprise master system of record 120, virtualization platform 130, source user computing device 140, filtering computer system 145, hop point 150, filtering computer system 155, hop point 160, filtering computer system 165, hop point 170, and recipient user computing device 175.

Referring to FIG. 1B, multi-filtering and randomizing control computing platform 110 may include one or more processors 111, memory 112, and communication interface 113. A data bus may interconnect processor 111, memory 112, and communication interface 113. Communication interface 113 may be a network interface configured to support communication between multi-filtering and randomizing control computing platform 110 and one or more networks (e.g., network 180 or the like). Memory 112 may include one or more program modules having instructions that when executed by processor 111 cause multi-filtering and randomizing control computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of multi-filtering and randomizing control computing platform 110 and/or by different computing devices that may form and/or otherwise make up multi-filtering and randomizing control computing platform 110. For example, memory 112 may have, store, and/or include a multi-filtering and randomizing control module 112a and a multi-filtering and randomizing control database 112b. Multi-filtering and randomizing control module 112a may have instructions that direct and/or cause multi-filtering and randomizing control computing platform 110 to process data access and/or transfer requests by controlling and/or configuring various systems and/or devices in computing environment 100 to implement multi-filtering and randomizing functionality, as discussed in greater detail below. Multi-filtering and randomizing control database 112b may store information used by multi-filtering and randomizing control module 112a and/or multi-filtering and randomizing control computing platform 110 in processing data access and/or transfer requests by controlling and/or configuring various systems and/or devices in computing environment 100 to implement multi-filtering and randomizing functionality and/or in performing other functions.

Figure 2A:
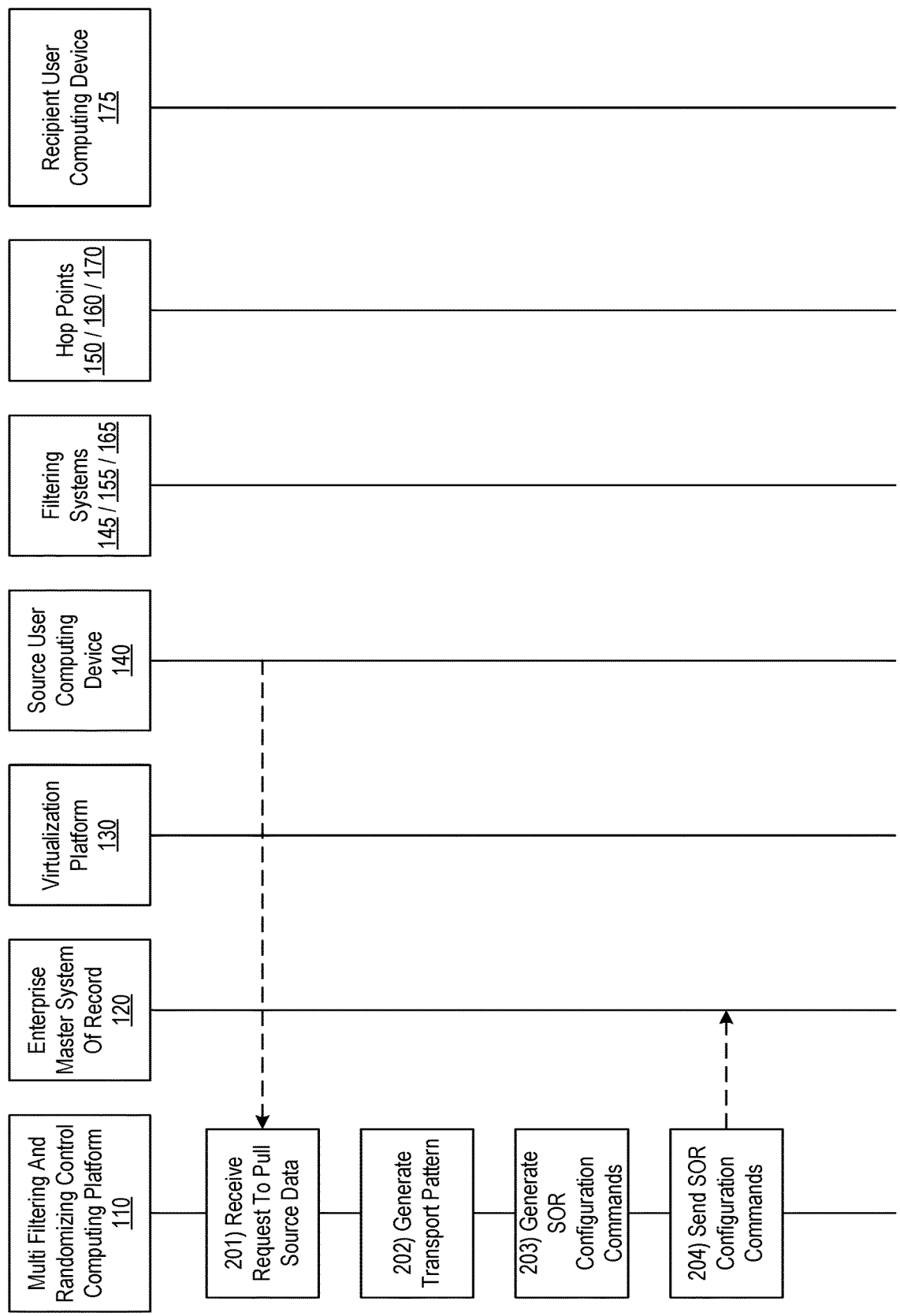

FIGS. 2A-2F depict an illustrative event sequence for preventing unauthorized access to secure enterprise information systems using a multi-filtering and randomizing control system in accordance with one or more example embodiments. Referring to FIG. 2A, at step 201, multi-filtering and randomizing control computing platform 110 may receive, from source user computing device 140, a request to pull a specific source dataset from enterprise master system of record 120. For example, at step 201, multi-filtering and randomizing control computing platform 110 may receive, via the communication interface (e.g., communication interface 113), from a source user computing device (e.g., source user computing device 140), a request to pull source data from an enterprise system of record (e.g., enterprise master system of record 120).

At step 202, multi-filtering and randomizing control computing platform 110 may generate a transport pattern to process the data access and/or transfer request received from source user computing device 140 at step 201. For example, at step 202, based on receiving the request to pull the source data from the enterprise system of record (e.g., enterprise master system of record 120), multi-filtering and randomizing control computing platform 110 may generate a transport pattern. In some embodiments, generating the transport pattern may include generating the transport pattern based on one or more transport pattern templates stored in a library of transport pattern templates maintained by the computing platform. For example, in generating the transport pattern, multi-filtering and randomizing control computing platform 110 may generate the transport pattern based on one or more transport pattern templates stored in a library of transport pattern templates maintained by the computing platform (e.g., multi-filtering and randomizing control computing platform 110). Such transport pattern templates may, for instance, define different sequences of filtering systems and/or hop points to be used in requesting data from different virtual system of record instances to fulfill and/or otherwise process a data access and/or transfer request.

In some embodiments, generating the transport pattern may include: randomly selecting a transport pattern template from the library of transport pattern templates maintained by the computing platform; and using the transport pattern template selected from the library of transport pattern templates maintained by the computing platform as the transport pattern. For example, in generating the transport pattern, multi-filtering and randomizing control computing platform 110 may randomly select a transport pattern template from the library of transport pattern templates maintained by the computing platform (e.g., multi-filtering and randomizing control computing platform 110). For instance, multi-filtering and randomizing control computing platform 110 may randomly select (e.g., using a random number generator algorithm) a particular template from the library of transport pattern templates to use in processing the particular data access and/or transfer request received from source user computing device 140 at step 201. In addition, multi-filtering and randomizing control computing platform 110 may use the transport pattern template selected from the library of transport pattern templates maintained by the computing platform (e.g., multi-filtering and randomizing control computing platform 110) as the transport pattern.

At step 203, multi-filtering and randomizing control computing platform 110 may generate one or more configuration commands for enterprise master system of record 120 based on the generated transport pattern (e.g., to configure enterprise master system of record 120 to return and/or otherwise provide access to the source data associated with the particular data access and/or transfer request received from source user computing device 140 at step 201). For example, at step 203, multi-filtering and randomizing control computing platform 110 may generate one or more first configuration commands for the enterprise system of record (e.g., enterprise master system of record 120) based on the transport pattern, and the one or more first configuration commands (which may, e.g., be generated by multi-filtering and randomizing control computing platform 110) may identify the source data to be pulled. At step 204, multi-filtering and randomizing control computing platform 110 may send the one or more configuration commands to enterprise master system of record 120. For example, at step 204, multi-filtering and randomizing control computing platform 110 may send, via the communication interface (e.g., communication interface 113), to the enterprise system of record (e.g., enterprise master system of record 120), the one or more first configuration commands generated for the enterprise system of record (e.g., enterprise master system of record 120).

Figure 2B:
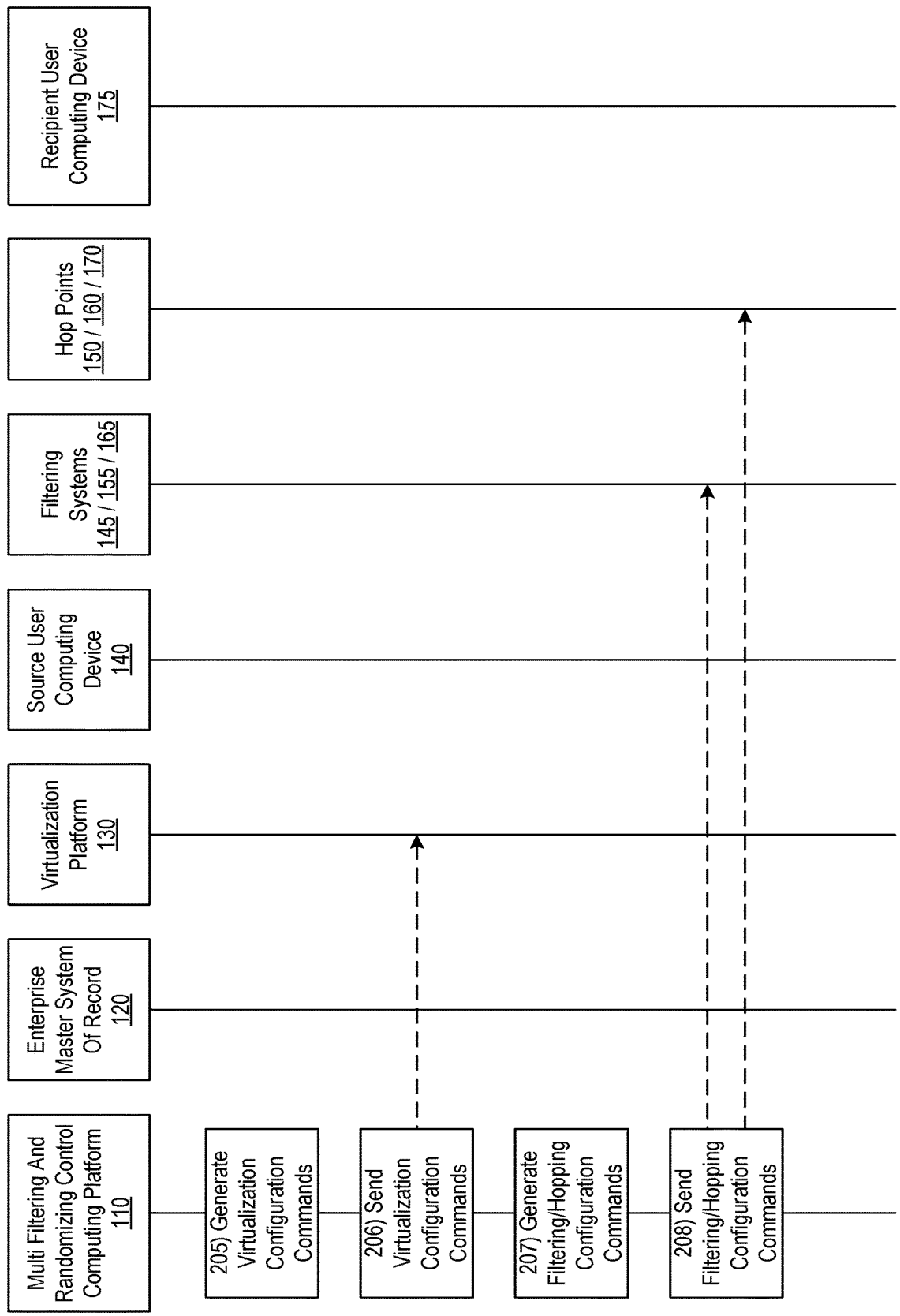

Referring to FIG. 2B, at step 205, multi-filtering and randomizing control computing platform 110 may generate one or more configuration commands for virtualization platform 130 based on the generated transport pattern (e.g., to configure virtualization platform 130 to generate and/or otherwise provide one or more virtual system of record instances via which one or more filtering systems may retrieve all or part of the source data associated with the particular data access and/or transfer request received from source user computing device 140 at step 201). For example, at step 205, multi-filtering and randomizing control computing platform 110 may generate one or more second configuration commands for a virtualization platform (e.g., virtualization platform 130) associated with the enterprise system of record (e.g., enterprise master system of record 120) based on the transport pattern, and the one or more second configuration commands may identify one or more virtual system of record instances to be instantiated (e.g., by virtualization platform 130). At step 206, multi-filtering and randomizing control computing platform 110 may send the one or more configuration commands to virtualization platform 130. For example, at step 206, multi-filtering and randomizing control computing platform 110 may send, via the communication interface (e.g., communication interface 113), to the virtualization platform (e.g., virtualization platform 130) associated with the enterprise system of record (e.g., enterprise master system of record 120), the one or more second configuration commands generated for the virtualization platform (e.g., virtualization platform 130) associated with the enterprise system of record (e.g., enterprise master system of record 120).

At step 207, multi-filtering and randomizing control computing platform 110 may generate one or more configuration commands for one or more filtering systems and hop points (e.g., filtering computer system 145, filtering computer system 155, filtering computer system 165, hop point 150, hop point 160, hop point 170) included in computing environment 100 (e.g., to configure filtering computer system 145, filtering computer system 155, and/or filtering computer system 165 to retrieve all or part of the source data associated with the particular data access and/or transfer request received from source user computing device 140 at step 201 from specific virtual system of record instances provided by virtualization platform 130 and/or to forward collected data to hop point 150, hop point 160, hop point 170, and/or one or more other systems and/or devices). For example, at step 207, multi-filtering and randomizing control computing platform 110 may generate one or more third configuration commands for one or more filtering systems (e.g., filtering computer system 145, filtering computer system 155, and filtering computer system 165) based on the transport pattern. In addition, multi-filtering and randomizing control computing platform 110 may generate one or more fourth configuration commands for one or more hop points (e.g., hop point 150, hop point 160, and hop point 170) based on the transport pattern. For instance, each filtering system (e.g., filtering computer system 145, filtering computer system 155, filtering computer system 165) may provide a request identifier to a specific virtual system of record instance and receive appropriate source data from the specific virtual system of record instance in response, as a result of the specific virtual system of record instance and/or virtualization platform 130 being configured by multi-filtering and randomizing control computing platform 110. In addition, each filtering system (e.g., filtering computer system 145, filtering computer system 155, filtering computer system 165) may be configured to send gathered data to a specific hop point (e.g., hop point 150, hop point 160, hop point 170) or other receiving system (e.g., recipient user computing device 175), and each hop point may be configured to send received data to a specific filtering system (e.g., filtering computer system 145, filtering computer system 155, filtering computer system 165) or other receiving system (e.g., recipient user computing device 175) based on the generated transport pattern.

In some embodiments, generating the one or more third configuration commands for the one or more filtering systems based on the transport pattern may include generating at least one configuration command directing a first filtering system to access a first identified virtual system of record instance to request first partial source data based on the transport pattern, where the first identified virtual system of record instance is provided by the virtualization platform associated with the enterprise system of record. For example, in generating the one or more third configuration commands for the one or more filtering systems (e.g., filtering computer system 145, filtering computer system 155, filtering computer system 165) based on the transport pattern, multi-filtering and randomizing control computing platform 110 may generate at least one configuration command directing a first filtering system (e.g., filtering computer system 145) to access a first identified virtual system of record instance to request first partial source data based on the transport pattern. In addition, the first identified virtual system of record instance may be provided by the virtualization platform (e.g., virtualization platform 130) associated with the enterprise system of record (e.g., enterprise master system of record 120). For instance, the one or more third configuration commands may identify which specific filtering systems (e.g., filtering computer system 145, filtering computer system 155, filtering computer system 165) should access which specific virtual system of record instances to request which specific data portions based on the transport pattern generated by multi-filtering and randomizing control computing platform 110. Additionally, in some instances, the at least one configuration command directing the first filtering system (e.g., filtering computer system 145) to access the first identified virtual system of record instance to request the first partial source data may direct the first filtering system (e.g., filtering computer system 145) to provide, to the first identified virtual system of record instance, a unique request identifier associated with the request to pull the source data from the enterprise system of record (e.g., enterprise master system of record 120). As a result of the virtualization platform (e.g., virtualization platform 130) being configured by the computing platform (e.g., multi-filtering and randomizing control computing platform 110), this unique request identifier may enable the first identified virtual system of record instance to provide the appropriate partial source data to the first filtering system (e.g., filtering computer system 145).

In some embodiments, generating the one or more third configuration commands for the one or more filtering systems based on the transport pattern may include generating at least one configuration command directing the first filtering system to send, to a first hop point based on the transport pattern, source data received from the first identified virtual system of record instance. For example, in generating the one or more third configuration commands for the one or more filtering systems (e.g., filtering computer system 145, filtering computer system 155, filtering computer system 165) based on the transport pattern, multi-filtering and randomizing control computing platform 110 may generate at least one configuration command directing the first filtering system (e.g., filtering computer system 145) to send, to a first hop point (e.g., hop point 150) based on the transport pattern, source data received from the first identified virtual system of record instance.

In some embodiments, generating the one or more fourth configuration commands for the one or more hop points based on the transport pattern may include generating at least one configuration command directing the first hop point to forward source data received from the first filtering system to a second filtering system different from the first filtering system based on the transport pattern. For example, in generating the one or more fourth configuration commands for the one or more hop points (e.g., hop point 150, hop point 160, hop point 170) based on the transport pattern, multi-filtering and randomizing control computing platform 110 may generate at least one configuration command directing the first hop point (e.g., hop point 150) to forward source data received (e.g., by hop point 150) from the first filtering system (e.g., filtering computer system 145) to a second filtering system (e.g., filtering computer system 155) different from the first filtering system (e.g., filtering computer system 145) based on the transport pattern.

In some embodiments, generating the one or more third configuration commands for the one or more filtering systems based on the transport pattern may include generating at least one configuration command directing the second filtering system to access a second identified virtual system of record instance to request second partial source data based on the transport pattern, where the second identified virtual system of record instance is provided by the virtualization platform associated with the enterprise system of record. For example, in generating the one or more third configuration commands for the one or more filtering systems (e.g., filtering computer system 145, filtering computer system 155, filtering computer system 165) based on the transport pattern, multi-filtering and randomizing control computing platform 110 may generate at least one configuration command directing the second filtering system (e.g., filtering computer system 155) to access a second identified virtual system of record instance to request second partial source data based on the transport pattern. In addition, the second identified virtual system of record instance may be provided by the virtualization platform (e.g., virtualization platform 130) associated with the enterprise system of record (e.g., enterprise master system of record 120).

In some embodiments, generating the one or more third configuration commands for the one or more filtering systems based on the transport pattern may include generating at least one configuration command directing the second filtering system to send, to a second hop point based on the transport pattern, source data received from the second identified virtual system of record instance and source data received the first hop point. For example, in generating the one or more third configuration commands for the one or more filtering systems (e.g., filtering computer system 145, filtering computer system 155, filtering computer system 165) based on the transport pattern, multi-filtering and randomizing control computing platform 110 may generate at least one configuration command directing the second filtering system (e.g., filtering computer system 155) to send, to a second hop point (e.g., hop point 160) based on the transport pattern, source data received from the second identified virtual system of record instance and source data received the first hop point (e.g., hop point 150).

In some embodiments, generating the one or more fourth configuration commands for the one or more hop points based on the transport pattern may include generating at least one configuration command directing the second hop point to forward source data received from the second filtering system to a recipient user computing device based on the transport pattern. For example, in generating the one or more fourth configuration commands for the one or more hop points (e.g., hop point 150, hop point 160, hop point 170) based on the transport pattern, multi-filtering and randomizing control computing platform 110 may generate at least one configuration command directing the second hop point (e.g., hop point 160) to forward source data received from the second filtering system (e.g., filtering computer system 155) to a recipient user computing device (e.g., recipient user computing device 175) based on the transport pattern. As a result of these configuration commands, the data received by the recipient user device (e.g., recipient user computing device 175) may, for instance, include both the source data received from the first identified virtual system of record instance (which may, e.g., have been originally obtained by filtering computer system 145 and then forwarded to hop point 150, then to filtering computer system 155, then to hop point 160) and the source data received from the second identified virtual system of record instance (which may, e.g., have been originally obtained by filtering computer system 155 and then forwarded to hop point 160). Thus, the data received by the recipient user device (e.g., recipient user computing device 175) may, for instance, correspond to the complete dataset corresponding to the original request to pull source data received from source user computing device 140.

At step 208, multi-filtering and randomizing control computing platform 110 may send the one or more configuration commands for one or more filtering systems and hop points (e.g., filtering computer system 145, filtering computer system 155, filtering computer system 165, hop point 150, hop point 160, hop point 170) to the one or more filtering systems and hop points (e.g., filtering computer system 145, filtering computer system 155, filtering computer system 165, hop point 150, hop point 160, hop point 170) included in computing environment 100. For example, at step 208, multi-filtering and randomizing control computing platform 110 may send, via the communication interface (e.g., communication interface 113), to the one or more filtering systems (e.g., filtering computer system 145, filtering computer system 155, filtering computer system 165), the one or more third configuration commands generated for one or more filtering systems (e.g., filtering computer system 145, filtering computer system 155, filtering computer system 165). In addition, multi-filtering and randomizing control computing platform 110 may send, via the communication interface (e.g., communication interface 113), to the one or more hop points (e.g., hop point 150, hop point 160, hop point 170), the one or more fourth configuration commands generated for one or more hop points (e.g., hop point 150, hop point 160, hop point 170).

Referring to FIG. 2C, at step 209, multi-filtering and randomizing control computing platform 110 may generate an initiation instruction command for source user computing device 140 (e.g., to begin execution of the data access and/or transfer process associated with the request received from source user computing device 140 at step 201). For example, at step 209, multi-filtering and randomizing control computing platform 110 may generate an initiation instruction command for the source user computing device (e.g., source user computing device 140) based on the transport pattern. In addition, the initiation instruction command may direct the source user computing device (e.g., source user computing device 140) to send at least one request to at least one data filtering system (e.g., filtering computer system 145) in accordance with the transport pattern.

Figure 3:
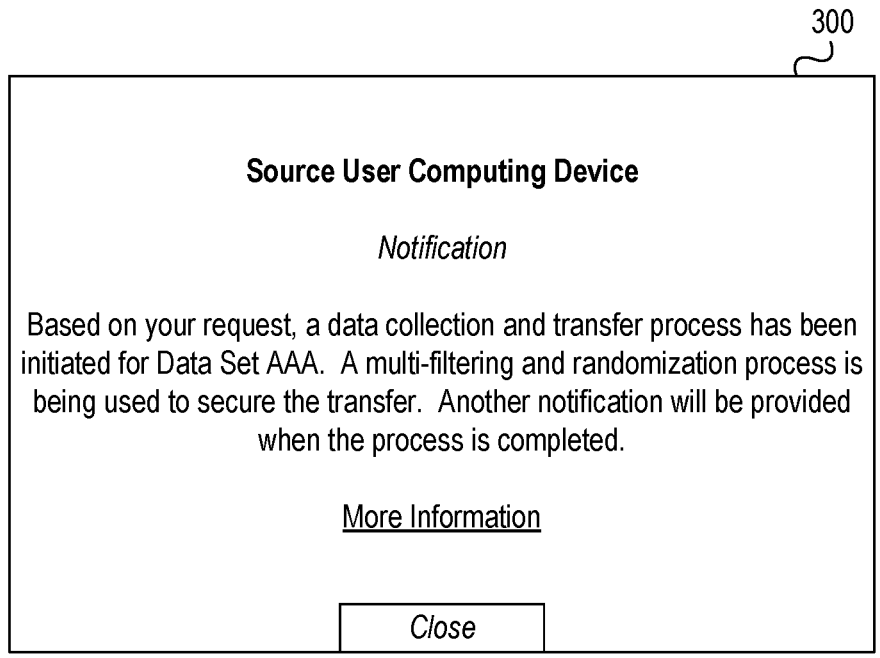
FIGS. 3 and 4 depict example graphical user interfaces for preventing unauthorized access to secure enterprise information systems using a multi-filtering and randomizing control system in accordance with one or more example embodiments.

At step 210, multi-filtering and randomizing control computing platform 110 may send the initiation instruction command to source user computing device 140. For example, at step 210, multi-filtering and randomizing control computing platform 110 may send, via the communication interface (e.g., communication interface 113), to the source user computing device (e.g., source user computing device 140), the initiation instruction command directing the source user computing device (e.g., source user computing device 140) to send the at least one request to the at least one data filtering system (e.g., filtering computer system 145) in accordance with the transport pattern. In some instances, in sending the initiation instruction command to source user computing device 140, multi-filtering and randomizing control computing platform 110 may cause source user computing device 140 to display and/or otherwise present a graphical user interface similar to graphical user interface 300, which is illustrated in FIG. 3. For example, as seen in FIG. 3, graphical user interface 300 may include text and/or other information notifying the user of source user computing device 140 that a data collection and transfer process has been initiated and/or that a multi-filtering and randomization process is being used to secure data collection and transfer process.

At step 211, source user computing device 140 may receive the initiation instruction command from multi-filtering and randomizing control computing platform 110. At step 212, source user computing device 140 may send a data request to filtering computer system 145 (e.g., based on the initiation instruction command received from multi-filtering and randomizing control computing platform 110).

Figure 2D:
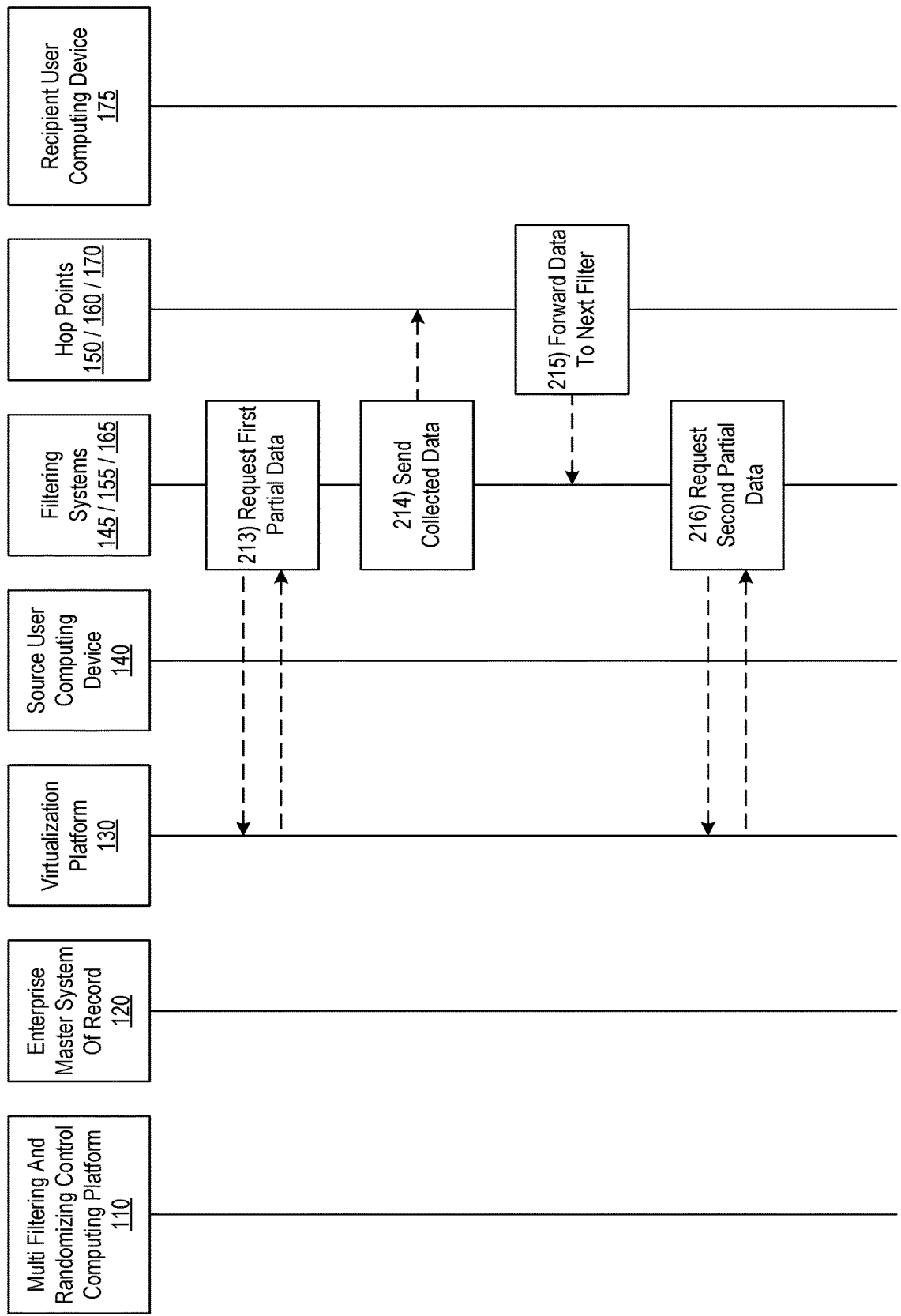

Referring to FIG. 2D, at step 213, filtering computer system 145 may request and receive first partial source data from a first virtual system of record instance hosted by virtualization platform 130 (e.g., based on the transport pattern and configuration commands generated by multi-filtering and randomizing control computing platform 110). Subsequently, at step 214, filtering computer system 145 may send the first partial source data collected from the first virtual system of record instance hosted by virtualization platform 130 to hop point 150. At step 215, hop point 150 may forward the data received from filtering computer system 145 (e.g., the first partial source data collected by filtering computer system 145 from the first virtual system of record instance hosted by virtualization platform 130) to filtering computer system 155. At step 216, filtering computer system 155 may request and receive second partial source data from a second virtual system of record instance hosted by virtualization platform 130 (e.g., based on the transport pattern and configuration commands generated by multi-filtering and randomizing control computing platform 110).

Figure 2E:
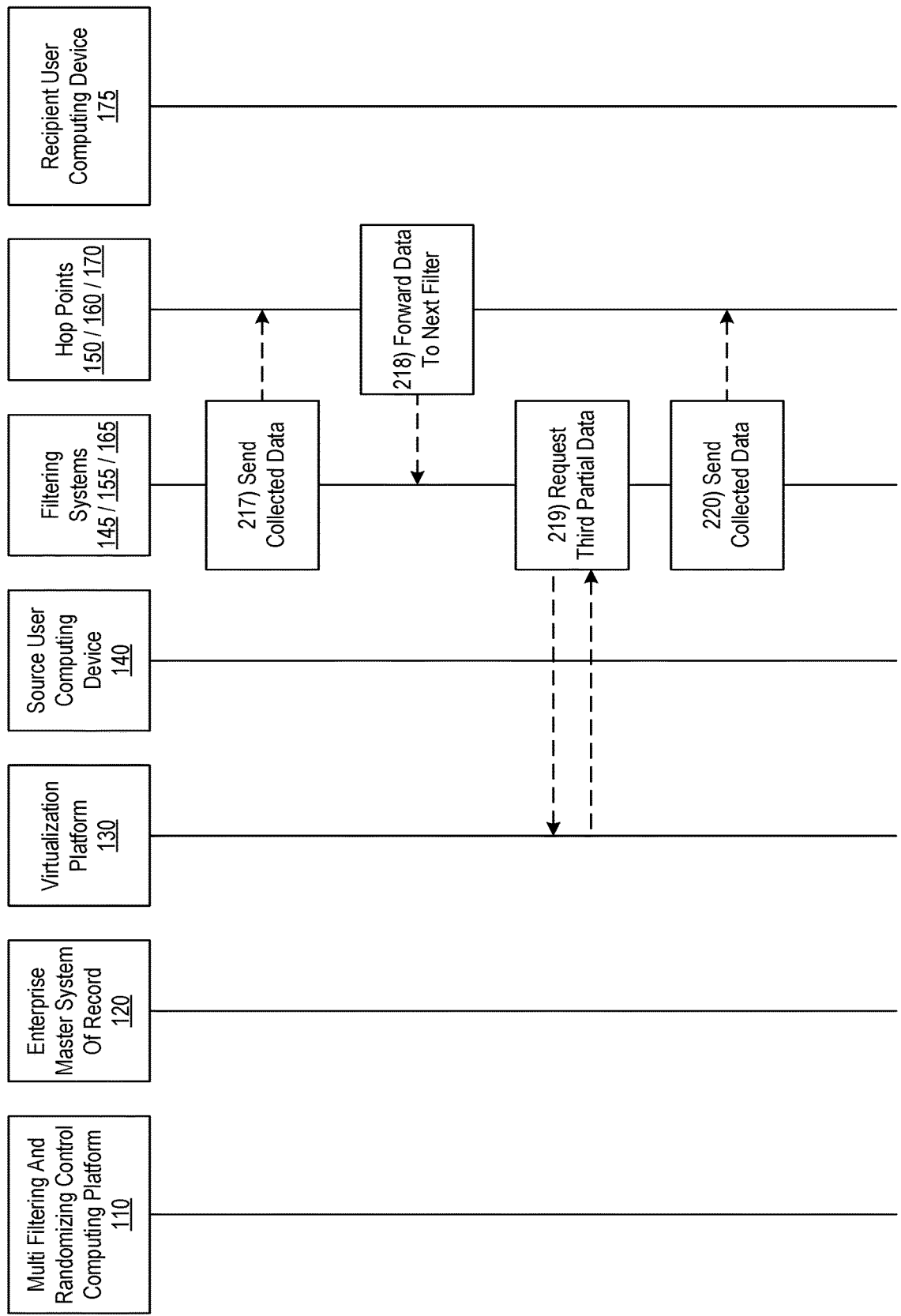

Referring to FIG. 2E, at step 217, filtering computer system 155 may send, to hop point 160, the second partial source data collected from the second virtual system of record instance hosted by virtualization platform 130. In addition, filtering computer system 155 may send, to hop point 160, the first partial source data collected by filtering computer system 145 from the first virtual system of record instance hosted by virtualization platform 130 and received by filtering computer system 155 from hop point 150. At step 218, hop point 160 may forward the data received from filtering computer system 155 (e.g., the second partial source data collected by filtering computer system 155 from the second virtual system of record instance hosted by virtualization platform 130 and the first partial source data received by filtering computer system 155 from hop point 150) to filtering computer system 165.

At step 219, filtering computer system 165 may request and receive third partial source data from a third virtual system of record instance hosted by virtualization platform 130 (e.g., based on the transport pattern and configuration commands generated by multi-filtering and randomizing control computing platform 110). At step 220, filtering computer system 165 may send, to hop point 170, the third partial source data collected from the third virtual system of record instance hosted by virtualization platform 130. In addition, filtering computer system 165 may send, to hop point 170, the first partial source data collected by filtering computer system 145 from the first virtual system of record instance hosted by virtualization platform 130 and received by filtering computer system 165 from hop point 160 and the second partial source data collected by filtering computer system 155 from the second virtual system of record instance hosted by virtualization platform 130 and received by filtering computer system 165 from hop point 160.

Figure 2F:
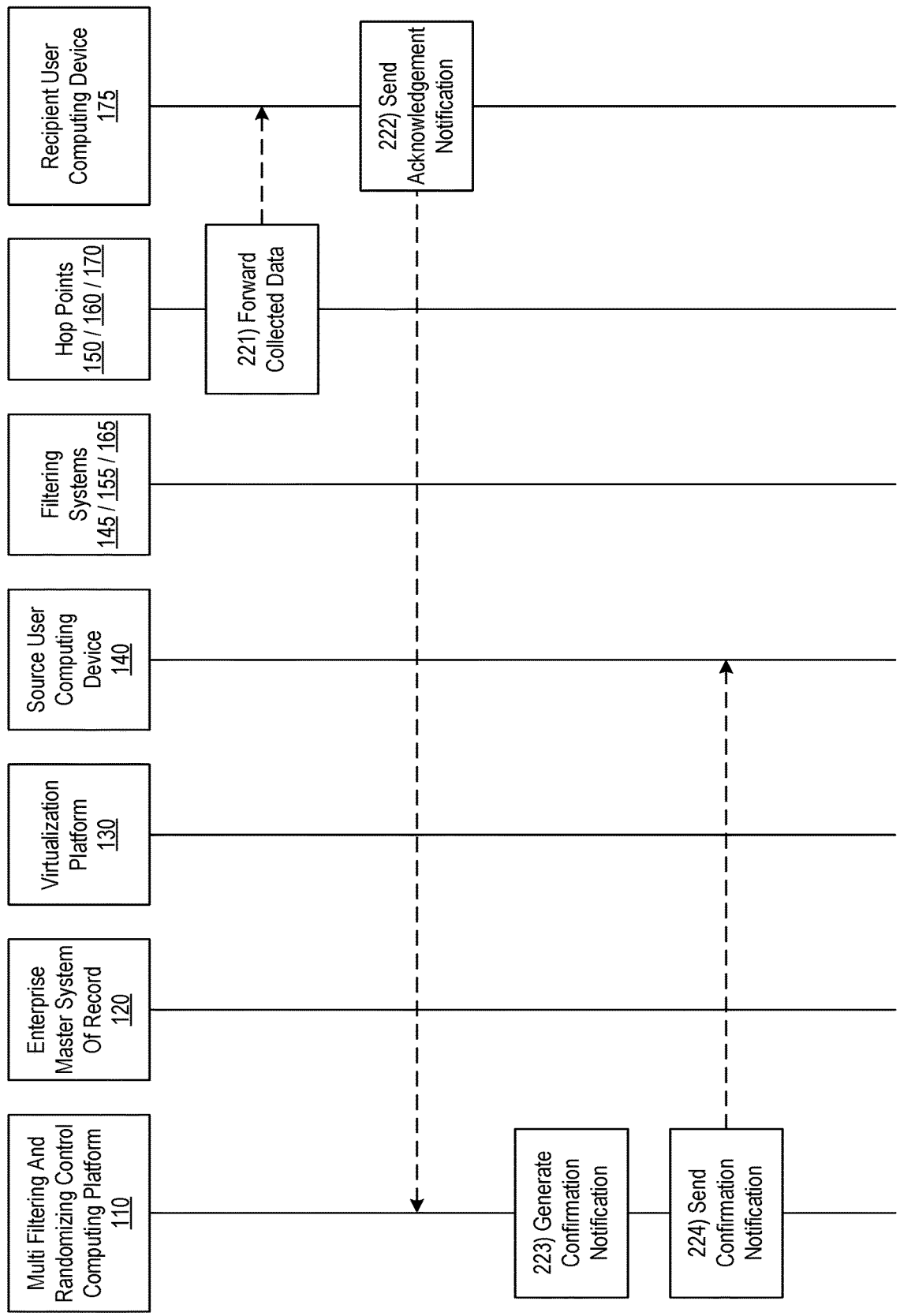

Referring to FIG. 2F, at step 221, hop point 170 may forward the data received from filtering computer system 165 (e.g., the third partial source data collected by filtering computer system 165 from the third virtual system of record instance hosted by virtualization platform 130, the first partial source data received by filtering computer system 165 from hop point 160, and the second partial source data received by filtering computer system 165 from hop point 160) to recipient user computing device 175. At step 222, recipient user computing device 175 may send an acknowledgement notification to multi-filtering and randomizing control computing platform 110 (e.g., based on receiving the data from hop point 170).

Figure 4:
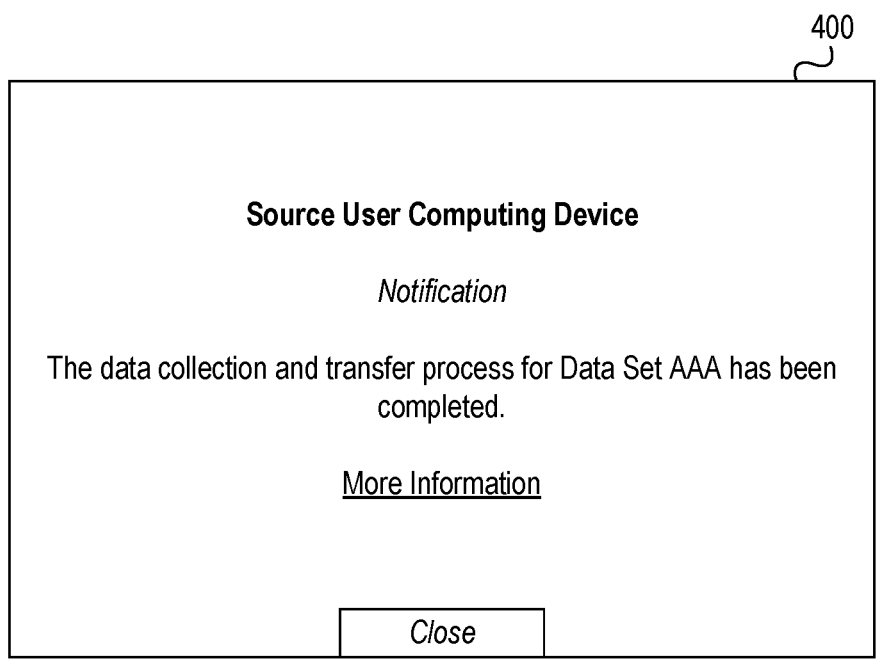

At step 223, multi-filtering and randomizing control computing platform 110 may generate a confirmation notification for source user computing device 140 (e.g., confirming that processing of the data access and/or transfer request has been completed, based on receiving the acknowledgement notification from recipient user computing device 175). For example, at step 223, based on receiving an acknowledgement notification from the recipient user computing device (e.g., recipient user computing device 175), multi-filtering and randomizing control computing platform 110 may generate a confirmation notification for the source user computing device (e.g., source user computing device 140). At step 224, multi-filtering and randomizing control computing platform 110 may send the confirmation notification to source user computing device 140. For example, at step 224, multi-filtering and randomizing control computing platform 110 may send, via the communication interface (e.g., communication interface 113), to the source user computing device (e.g., source user computing device 140), the confirmation notification generated for the source user computing device (e.g., source user computing device 140). In addition, sending the confirmation notification generated for the source user computing device (e.g., source user computing device 140) to the source user computing device (e.g., source user computing device 140) may cause the source user computing device (e.g., source user computing device 140) to display the confirmation notification. For example, in sending the confirmation notification to source user computing device 140, multi-filtering and randomizing control computing platform 110 may cause source user computing device 140 to display and/or otherwise present a graphical user interface similar to graphical user interface 400, which is illustrated in FIG. 4. For example, as seen in FIG. 4, graphical user interface 400 may include text and/or other information notifying the user of source user computing device 140 that a data collection and transfer process has been completed.

By implementing one or more techniques and/or other features discussed above, multi-filtering and randomizing control computing platform 110 may improve information security by making it more difficult for a malicious system, device, and/or user to intercept sensitive data and/or attack a master system of record, such as enterprise master system of record 120. For example, the pattern used by multi-filtering and randomizing control computing platform 110 in processing data requests may change with each request, and so if a particular communication is intercepted during processing of a particular request, a future communication may take a different route and/or request data from a different virtual system of record instance, thereby preventing an attack and thus improving information security.

Figure 5:
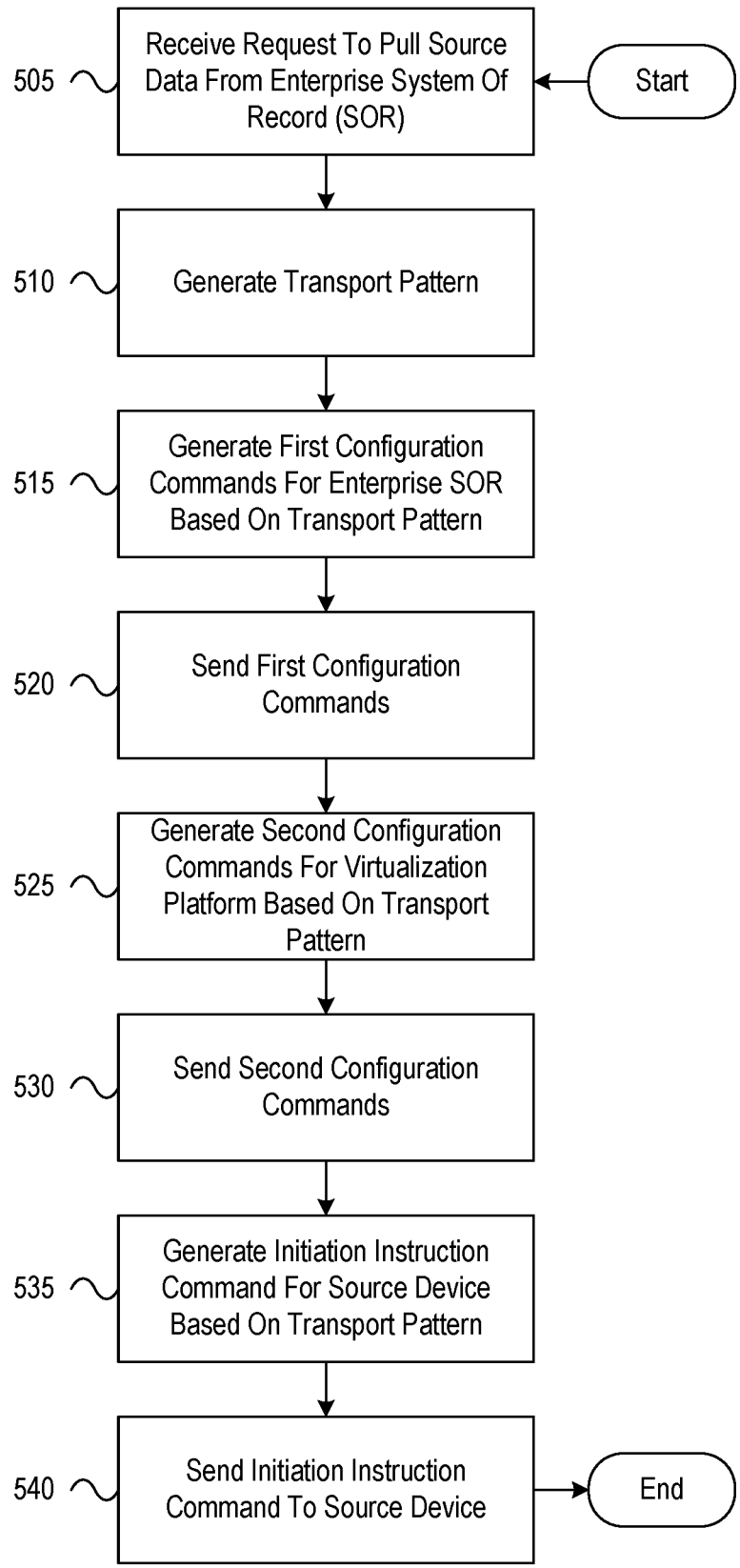
FIG. 5 depicts an illustrative method for preventing unauthorized access to secure enterprise information systems using a multi-filtering and randomizing control system in accordance with one or more example embodiments.

FIG. 5 depicts an illustrative method for preventing unauthorized access to secure enterprise information systems using a multi-filtering and randomizing control system in accordance with one or more example embodiments. Referring to FIG. 5, at step 505, a computing platform having at least one processor, a communication interface communicatively coupled to the at least one processor, and memory storing computer-readable instructions may receive, via the communication interface, from a source user computing device, a request to pull source data from an enterprise system of record. At step 510, based on receiving the request to pull the source data from the enterprise system of record, the computing platform may generate a transport pattern. At step 515, the computing platform may generate one or more first configuration commands for the enterprise system of record based on the transport pattern, and the one or more first configuration commands may identify the source data to be pulled. At step 520, the computing platform may send, via the communication interface, to the enterprise system of record, the one or more first configuration commands generated for the enterprise system of record. At step 525, the computing platform may generate one or more second configuration commands for a virtualization platform associated with the enterprise system of record based on the transport pattern, and the one or more second configuration commands may identify one or more virtual system of record instances to be instantiated. At step 530, the computing platform may send, via the communication interface, to the virtualization platform associated with the enterprise system of record, the one or more second configuration commands generated for the virtualization platform associated with the enterprise system of record. At step 535, the computing platform may generate an initiation instruction command for the source user computing device based on the transport pattern, and the initiation instruction command may direct the source user computing device to send at least one request to at least one data filtering system in accordance with the transport pattern. At step 540, the computing platform may send, via the communication interface, to the source user computing device, the initiation instruction command directing the source user computing device to send the at least one request to the at least one data filtering system in accordance with the transport pattern.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from a source user computing device, a request to pull source data from an enterprise system of record;
   based on receiving the request to pull the source data from the enterprise system of record, generate a transport pattern, wherein generating the transport pattern comprises
   generating the transport pattern based on one or
   more transport pattern templates stored in a library
   of transport pattern templates maintained by the
   computing platform, and
wherein generating the transport pattern comprises:
   randomly selecting a transport pattern template
      from the library of transport pattern templates
      maintained by the computing platform; and
   using the transport pattern template selected from
      the library of transport pattern templates maintained by the computing platform as the transport pattern;
generate one or more first configuration commands for
   the enterprise system of record based on the transport
   pattern, the one or more first configuration commands identifying the source data to be pulled;
send, via the communication interface, to the enterprise
   system of record, the one or more first configuration
   commands generated for the enterprise system of
   record;
generate one or more second configuration commands
   for a virtualization platform associated with the
   enterprise system of record based on the transport
   pattern, the one or more second configuration commands identifying one or more virtual system of
   record instances to be instantiated;
send, via the communication interface, to the virtualization platform associated with the enterprise system of record, the one or more second configuration
   commands generated for the virtualization platform
   associated with the enterprise system of record;
generate one or more third configuration commands for
   one or more filtering systems based on the transport
   pattern, wherein generating the one or more third
   configuration commands for the one or more filtering
   systems based on the transport pattern comprises
   generating at least one configuration command
   directing a first filtering system to access a first
   identified virtual system of record instance to request
   first partial source data based on the transport pattern, the first identified virtual system of record
   instance being provided by the virtualization platform associated with the enterprise system of record,
   wherein the at least one configuration command
   directing the first filtering system to access the first
   identified virtual system of record instance to request
   the first partial source data based on the transport
   pattern directs the first filtering system to provide, to
   the first identified virtual system of record instance,
   a unique request identifier associated with the
   request to pull the source data from the enterprise
   system of record;
generate one or more fourth configuration commands
   for one or more hop points based on the transport
   pattern;
send, via the communication interface, to the one or
   more filtering systems, the one or more third configuration commands generated for one or more
   filtering systems;
send, via the communication interface, to the one or
   more hop points, the one or more fourth configuration commands generated for one or more hop
   points;
generate an initiation instruction command for the
   source user computing device based on the transport
   pattern, the initiation instruction command directing
   the source user computing device to send at least one
   request to at least one data filtering system in accordance with the transport pattern; and
send, via the communication interface, to the source
   user computing device, the initiation instruction
   command directing the source user computing
   device to send the at least one request to the at least
   one data filtering system in accordance with the
   transport pattern,
wherein each transport pattern template of the one or
   more transport pattern templates stored in the library
   of transport pattern templates maintained by the
   computing platform defines a different sequence of
   filtering systems and hop points to be used in
   requesting data from different virtual system of
   record instances.

2. The computing platform of claim 1, wherein generating the one or more third configuration commands for the one or more filtering systems based on the transport pattern comprises generating at least one configuration command directing the first filtering system to send, to a first hop point based on the transport pattern, source data received from the first identified virtual system of record instance.

3. The computing platform of claim 2, wherein generating the one or more fourth configuration commands for the one or more hop points based on the transport pattern comprises generating at least one configuration command directing the first hop point to forward source data received from the first filtering system to a second filtering system different from the first filtering system based on the transport pattern.

4. The computing platform of claim 3, wherein generating the one or more third configuration commands for the one or more filtering systems based on the transport pattern comprises generating at least one configuration command directing the second filtering system to access a second identified virtual system of record instance to request second partial source data based on the transport pattern, the second identified virtual system of record instance being provided by the virtualization platform associated with the enterprise system of record.

5. The computing platform of claim 4, wherein generating the one or more third configuration commands for the one or more filtering systems based on the transport pattern comprises generating at least one configuration command directing the second filtering system to send, to a second hop point based on the transport pattern, source data received from the second identified virtual system of record instance and source data received the first hop point.

6. The computing platform of claim 5, wherein generating the one or more fourth configuration commands for the one or more hop points based on the transport pattern comprises generating at least one configuration command directing the second hop point to forward source data received from the second filtering system to a recipient user computing device based on the transport pattern.

7. The computing platform of claim 6, wherein the memory stores additional computer-readable instructions that, when executed by the at least one processor, cause the computing platform to:
   based on receiving an acknowledgement notification from the recipient user computing device, generate a confirmation notification for the source user computing device; and
   send, via the communication interface, to the source user computing device, the confirmation notification generated for the source user computing device, wherein sending the confirmation notification generated for the source user computing device to the source user computing device causes the source user computing device to display the confirmation notification.

8. A method, comprising:

at a computing platform comprising at least one processor, memory, and a communication interface:
receiving, by the at least one processor, via the communication interface, from a source user computing device, a request to pull source data from an enterprise system of record;
based on receiving the request to pull the source data from the enterprise system of record, generating, by the at least one processor, a transport pattern,
wherein generating the transport pattern comprises generating the transport pattern based on one or more transport pattern templates stored in a library of transport pattern templates maintained by the computing platform, and
wherein generating the transport pattern comprises:
randomly selecting a transport pattern template from the library of transport pattern templates maintained by the computing platform; and
using the transport pattern template selected from the library of transport pattern templates maintained by the computing platform as the transport pattern;
generating, by the at least one processor, one or more first configuration commands for the enterprise system of record based on the transport pattern, the one or more first configuration commands identifying the source data to be pulled;
sending, by the at least one processor, via the communication interface, to the enterprise system of record, the one or more first configuration commands generated for the enterprise system of record;
generating, by the at least one processor, one or more second configuration commands for a virtualization platform associated with the enterprise system of record based on the transport pattern, the one or more second configuration commands identifying one or more virtual system of record instances to be instantiated;
sending, by the at least one processor, via the communication interface, to the virtualization platform associated with the enterprise system of record, the one or more second configuration commands generated for the virtualization platform associated with the enterprise system of record;
generating, by the at least one processor, one or more third configuration commands for one or more filtering systems based on the transport pattern, wherein generating the one or more third configuration commands for the one or more filtering systems based on the transport pattern comprises generating at least one configuration command directing a first filtering system to access a first identified virtual system of record instance to request first partial source data based on the transport pattern, the first identified virtual system of record instance being provided by the virtualization platform associated with the enterprise system of record, wherein the at least one configuration command directing the first filtering system to access the first identified virtual system of record instance to request the first partial source data based on the transport pattern directs the first filtering system to provide, to the first identified virtual system of record instance, a unique request identifier associated with the request to pull the source data from the enterprise system of record;
generating, by the at least one processor, one or more fourth configuration commands for one or more hop points based on the transport pattern;
sending, by the at least one processor, via the communication interface, to the one or more filtering systems, the one or more third configuration commands generated for one or more filtering systems;
sending, by the at least one processor, via the communication interface, to the one or more hop points, the one or more fourth configuration commands generated for one or more hop points;
generating, by the at least one processor, an initiation instruction command for the source user computing device based on the transport pattern, the initiation instruction command directing the source user computing device to send at least one request to at least one data filtering system in accordance with the transport pattern; and
sending, by the at least one processor, via the communication interface, to the source user computing device, the initiation instruction command directing the source user computing device to send the at least one request to the at least one data filtering system in accordance with the transport pattern,
wherein each transport pattern template of the one or more transport pattern templates stored in the library of transport pattern templates maintained by the computing platform defines a different sequence of filtering systems and hop points to be used in requesting data from different virtual system of record instances.

9. The method of claim 8, wherein generating the one or more third configuration commands for the one or more filtering systems based on the transport pattern comprises generating at least one configuration command directing the first filtering system to send, to a first hop point based on the transport pattern, source data received from the first identified virtual system of record instance.

10. The method of claim 9, wherein generating the one or more fourth configuration commands for the one or more hop points based on the transport pattern comprises generating at least one configuration command directing the first hop point to forward source data received from the first filtering system to a second filtering system different from the first filtering system based on the transport pattern.

11. The method of claim 10, wherein generating the one or more third configuration commands for the one or more filtering systems based on the transport pattern comprises generating at least one configuration command directing the second filtering system to access a second identified virtual system of record instance to request second partial source data based on the transport pattern, the second identified virtual system of record instance being provided by the virtualization platform associated with the enterprise system of record.

12. One or more non-transitory computer-readable media storing instructions that, when executed by a computing platform comprising at least one processor, memory, and a communication interface, cause the computing platform to:
receive, via the communication interface, from a source user computing device, a request to pull source data from an enterprise system of record;
based on receiving the request to pull the source data from the enterprise system of record, generate a transport pattern, wherein generating the transport pattern comprises
generating the transport pattern based on one or more
transport pattern templates stored in a library of
transport pattern templates maintained by the computing platform, and wherein generating the transport pattern comprises:
randomly selecting a transport pattern template from the library of transport pattern templates maintained by the computing platform; and
using the transport pattern template selected from the library of transport pattern templates maintained by the computing platform as the transport pattern;

generate one or more first configuration commands for the enterprise system of record based on the transport pattern, the one or more first configuration commands identifying the source data to be pulled;

send, via the communication interface, to the enterprise system of record, the one or more first configuration commands generated for the enterprise system of record;

generate one or more second configuration commands for a virtualization platform associated with the enterprise system of record based on the transport pattern, the one or more second configuration commands identifying one or more virtual system of record instances to be instantiated;

send, via the communication interface, to the virtualization platform associated with the enterprise system of record, the one or more second configuration commands generated for the virtualization platform associated with the enterprise system of record;

generate one or more third configuration commands for one or more filtering systems based on the transport pattern, wherein generating the one or more third configuration commands for the one or more filtering systems based on the transport pattern comprises generating at least one configuration command directing a first filtering system to access a first identified virtual system of record instance to request first partial source data based on the transport pattern, the first identified virtual system of record instance being provided by the virtualization platform associated with the enterprise system of record, wherein the at least one configuration command directing the first filtering system to access the first identified virtual system of record instance to request the first partial source data based on the transport pattern directs the first filtering system to provide, to the first identified virtual system of record instance, a unique request identifier associated with the request to pull the source data from the enterprise system of record;

generate one or more fourth configuration commands for one or more hop points based on the transport pattern;

send, via the communication interface, to the one or more filtering systems, the one or more third configuration commands generated for one or more filtering systems;

send, via the communication interface, to the one or more hop points, the one or more fourth configuration commands generated for one or more hop points;

generate an initiation instruction command for the source user computing device based on the transport pattern, the initiation instruction command directing the source user computing device to send at least one request to at least one data filtering system in accordance with the transport pattern; and send, via the communication interface, to the source user computing device, the initiation instruction command directing the source user computing device to send the at least one request to the at least one data filtering system in accordance with the transport pattern, wherein each transport pattern template of the one or more transport pattern templates stored in the library of transport pattern templates maintained by the computing platform defines a different sequence of filtering systems and hop points to be used in requesting data from different virtual system of record instances.

* * * * *